UNITED STATES PATENT OFFICE.

ORESTA WOODWORTH YOUNG, OF CHICAGO, ILLINOIS.

COMPOSITION FOR CLEANING AND POLISHING GOLD, SILVER, &c.

SPECIFICATION forming part of Letters Patent No. 327,426, dated September 29, 1885.

Application filed January 26, 1885. (Specimens.)

*To all whom it may concern:*

Be it known that I, ORESTA W. YOUNG, a citizen of the United States, residing in the city of Chicago, in the county of Cook and 5 State of Illinois, have invented a new and useful composition of matter to be used in the cleaning and polishing of gold, silver, tin, nickel, brass, copper, and all polished composite metals, of which the following is a specification.

My composition consists of the following ingredients, combined in the proportions, or about the proportions, stated, viz: distilled water, three quarts, (solution one gallon;) 15 aqua-ammonia, eight ounces; alcohol, sixteen ounces; float stone, or white infusorial earth containing ninety-nine and three-tenths silica or silex, ten ounces, or about that amount. These ingredients are to be thoroughly mingled by agitation.

In using the above-named composition, when applied to a polished even surface of metal, use a cloth saturated with the composition and apply sufficient to moisten the whole surface, and then wipe and polish with a dry cloth or skin. When using on a hammered or uneven surface, a brush may be used in order to thoroughly moisten the same. Polishing can also be done by a soft brush where a dry cloth or skin will not answer the purpose, and in case sediment should gather in fine engraving or places that could not be reached by a brush an application of suds or pure water can be used.

I am aware that some portion of the matter used in my composition has been heretofore used for the purpose of cleaning and polishing metals; but I am not aware that all the ingredients of my composition in the proportions stated have been used together either in a liquid or powdered form.

What I claim, and desire to secure by Letters Patent, is—

The herein-described composition of matter to be used for cleaning and polishing gold, silver, and all composite metals, consisting of distilled water, aqua-ammonia, alcohol, and infusorial earth, substantially in the proportions as herein specified and set forth.

ORESTA WOODWORTH YOUNG.

Witnesses:
E. H. GLEASON,
E. CHARPIER.